April 22, 1958  H. LIBBERTON  2,831,224
MATRIX AND METHOD OF MAKING SAME
Filed Feb. 21, 1955  2 Sheets-Sheet 1

INVENTOR
HERBERT LIBBERTON
BY Moore, Prangley & Clayton
ATTORNEYS

April 22, 1958   H. LIBBERTON   2,831,224
MATRIX AND METHOD OF MAKING SAME
Filed Feb. 21, 1955   2 Sheets-Sheet 2

INVENTOR
HERBERT LIBBERTON
BY Moore, Prangley & Clayton
ATTORNEYS

United States Patent Office 2,831,224
Patented Apr. 22, 1958

2,831,224

MATRIX AND METHOD OF MAKING SAME

Herbert Libberton, Chicago, Ill., assignor to Tenak Products Company, Chicago, Ill., a corporation of Illinois Application February 21, 1955, Serial No. 489,501

17 Claims. (Cl. 22—5.5)

This invention relates to the art of printing and more particularly to stereotype matrices, the method of forming stereotype matrices, blankets used in the forming operation, and methods of casting stereotype printing plates.

Stereotype matrices have usually been made heretofore by placing an unmolded sheet or flong upon a surface to be reproduced such as an electrotype or a type form and thereafter molding the flong to the contour of the surface. The flong is a loose layer of fibrous material such as paper pulp or may be composed of alternate layers of paper tissue and blotter type sheets which are glued together. Preferably the flong is clay coated.

In molding flongs to produce a stereotype matrix, a molding blanket is placed on top of the flong in position on the form or plate before pressure is applied as by a press platen or any other type of suitable pressure applying mechanism acting upon the upper surface of the molding blanket. The molding blanket improves the impression made by the form or plate which is to be reproduced in the molded stereotype matrix. The flong is accurately molded to conform to the material to be reproduced in the printing areas, but is not accurately molded to conform to the non-printing areas. This in itself is not undesirable since only the printing surfaces need be accurately reproduced provided the non-printing areas are at least slightly contoured whereby to prevent printing in these areas in the finished stereotype printing plate made from the molded stereotype matrix. The back of the flong is also contoured in the non-printing areas. Molding blankets used heretofore have been sheets of rubber or cork or combinations thereof, combinations of rubber and felt, or several sheets of blotting paper.

After the flong has been molded to produce a stereotype matrix, the matrix is stripped from the form or electrotype, packing strips are then applied in the back of non-printing areas, and the matrix thereafter scorched. The scorched matrix is then positioned vertically in a casting box and the side of the matrix that was positioned against the electrotype has poured thereagainst hot stereotype metal which produces a stereotype printing plate.

Since the untreated stereotype matrix is subjected to considerable pressure from the weight of the column of stereotype metal and additionally from the high vacuum used in most casting boxes, the contoured portions of the matrix corresponding to the non-printing areas which if not packed may be bent or forced toward the support surface until the contoured back of the flong lies against the support surface. In this event the non-printing areas tend to assume the same level as the molded printing areas thereby producing undesirable high spots on the cast stereotype plate. Attempts have been made to overcome this problem in the past by applying packing strips such as gummed strips of blotter paper to the back of the stereotype matrix (i. e., the face opposite that molded against the electrotype) to support the non-printing areas during casting of stereotype printing plates therefrom. This process of applying packing strips in the non-printing areas is tedious and time consuming and therefore expensive. Furthermore, it is impractical to apply packing strips in all of the non-printing areas of the matrix and even if meticulous care is used with minute packing strips to support all areas around type and halftones, sharp edges are still produced because it is impossible to prevent the formation of hard printing edges on the halftones and the concaving of type areas.

Sometimes it is desired to cast 20 or more stereotype printing plates from a single matrix. The plates cast from a single matrix are seldom identical due to the distortion and deformation of the matrix during successive casting operations. When producing stereotype printing plates for multicolor printing in which several individual printing operations must be superimposed on a single sheet, care must be taken that, for example, the tenth plate cast from each of the color matrices be used together and that similarly corresponding numbered plates from the various color matrices be used in other presses. If the tenth plate of one color is used with for example, the twentieth plate of another color, the register of the two colors will not be satisfactory. A further problem in registration arises if, for example, a press smash occurs on one of the color plates from set No. 10. Either the entire tenth set of the plates must be discarded or that particular color plate must be remolded and ten stereotype plates cast to obtain a stereotype plate which will register with the other three color plates. This situation is undesirable and, accordingly, it would be advantageous to use any of the stereotype printing plates from one color matrix with any plate from a different color matrix and still obtain good register.

Efforts have heretofore been made to overcome some or all of the above disadvantages by using a substantially unreacted phenolic impregnated sheet as a molding blanket on top of the flong. This procedure in general has been unsatisfactory for several reasons. In carrying out the process the unreacted phenolic resin impregnated sheet is placed in contact with the wet flong whereupon the moisture in the flong softens the resin and renders the impregnated sheet substantially flexible. With the resin impregnated sheet in this condition, it is not a good molding blanket in that it does not possess sufficient structural strength to push the fibers in the flong into the minute depressions in the form or plate and therefore produces relatively poor quality in the stereotype matrices. In an effort to overcome this disadvantage of the unreacted resin impregnated sheet, additional molding blankets of the usual type are applied. But this results in considerable contouring of the resin impregnated sheet making considerable packing with packing strips necessary. Another disadvantage of the unreacted phenolic resin impregnated sheet in its use as the molding blanket is the fact that the resin in the sheet continues to advance or cure in storage so that it is operative only for a very limited period after its formation.

When using the unreacted phenolic resin impregnated sheet as a molding blanket, the assembly of the resin molding blanket and the molded flong is removed from the form or plate being reproduced and is then scorched in the usual manner. Because of the high amount of moisture given off by the wet flong, the resin impregnated sheet does not appreciably cure during the molding operation and begins to cure only during the scorching operation. As a result the assembly of the molding blanket and the flong is quite flexible and may be considerably distorted if not handled carefully. The scorching operation sets or cures the unreacted resin in the molding blanket and causes the molding blanket to adhere to the molded flong. However, the curing of the resin is accompanied by the evolution of evil smelling vapors including formaldehyde which are most disagreeable to the workers. In addition the resin shrinks substantially during curing and therefore further distorts the molded flong during the scorching and curing operations. This results in a stereotype matrix having poor dimensional stability.

As a result of the above described shrinkages and further as a result of the tendency of the molded flong or matrix itself to shrink, stereotype matrices made with unreacted phenolic resin impregnated sheets as a molding blanket exhibit poor register in multicolor work. In fact the register with matrices made in this manner is even poorer in certain instances than that with standard matrices due to the shrinking of the resin in the molding blanket during the curing thereof.

It is an important object of the present invention to provide an improved stereotype matrix; more particularly it is an object of the invention to provide a stereotype matrix which will not bend or cave in the non-printing areas during the casting of stereotype metal thereon and which need not have applied thereto packing strips or similar artificial build up material utilized heretofore.

Another object of the invention is to provide an improved molding blanket for use in molding stereotype matrices, the use of which molding blanket produces matrices of superior quality and matrices which will not bend or cave in the non-printing areas when stereotype metal is cast thereon.

Yet another object of the invention is to provide an improved molding blanket for use in molding stereotype matrices which during the molding process is attached to the molded stereotype matrix to support the contoured non-printing areas thereon against a rigid surface while stereotype metal is being cast against the stereotype matrix.

Still another object of the invention is to provide an improved molding blanket for use in molding stereotype matrices of the type set forth so that a matrix incorporating the improved molding blanket has greater dimensional stability during molding of printing plates therefrom so that all the plates molded from a single matrix are identical.

Yet another object of the invention is to provide an improved molding blanket for use in molding stereotype matrices which is compressible substantially only in a vertical direction and does not permit side movement whereby to maintain the pressure at the areas of the type faces and halftones being reproduced at high pressure thereby producing more accurate reproductions of the type faces and halftones than has been possible heretofore.

In conjunction with the foregoing object it is yet another object of the invention to provide a molding blanket and a stereotype matrix which can be used in multicolor printing, any stereotype printing plate cast from one matrix being useable with any stereotype casting made from another matrix to achieve good register in printing.

Still another object of the invention is to provide an improved method of molding stereotype matrices.

A further object of the invention is to provide an improved method of molding stereotype matrices in which make ready can be applied in the molding of the stereotype matrix and reproduced over and over in the plates cast therefrom without loss.

These and other objects and advantages of the invention will be better understood from the following description when taken in connection with the accompanying drawing. In the drawing wherein like reference numerals have been utilized to designate like parts throughout:

Figure 1:
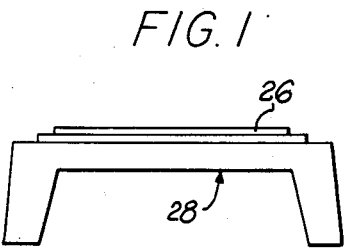
Figure 1 is a diagrammatical view illustrating the first step in the formation of the molding blanket of the present invention.

The blanket and forming method of the present invention can be used generally to reproduce any form designed for letter press printing. More specifically, the stereotype flong may be molded according to the present invention against a type form, for example, including letters, halftone matter, line matter, and the like. Any other form of printing plate may also be used as the original as for example an electrotype. For purposes of illustration the present invention has been shown in the drawings as applied to the reproducing of an electrotype but the invention is not limited to the reproduction of this particular form of printed matter.

Figure 2:
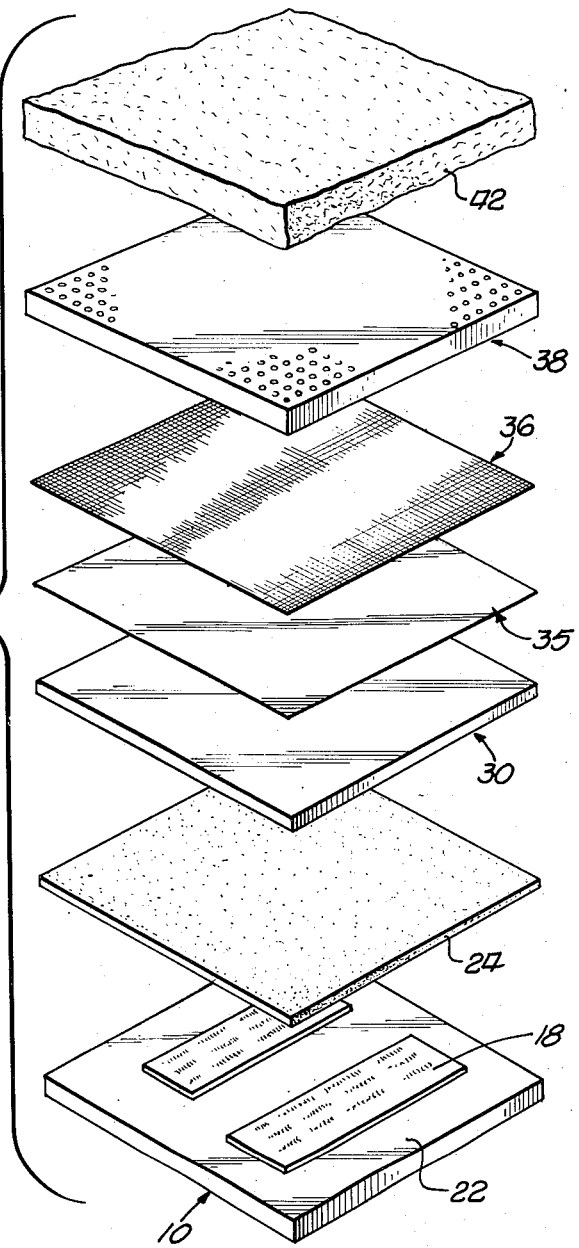
Figure 2 is an exploded view in perspective of an assembly made in accordance with the present invention including a molding blanket made in accordance with the present invention.
Figure 4:
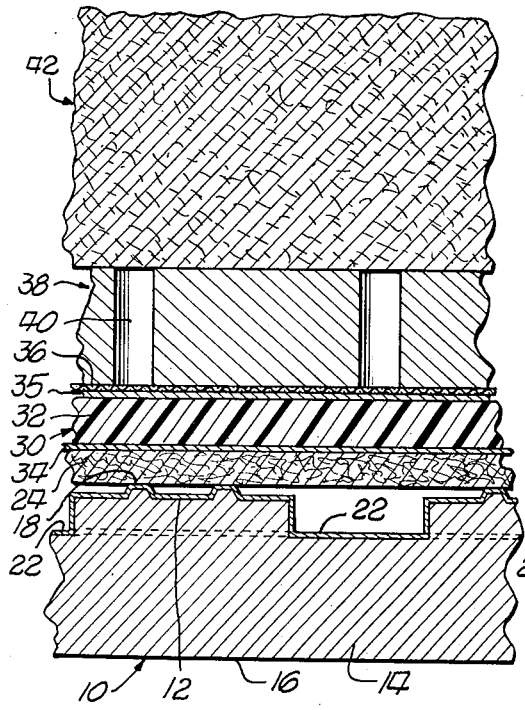
Figure 4 is an enlarged partial view in vertical section through an assembly including a molding blanket made in accordance with the present invention, the assembly being that useful in producing a stereotype matrix according to the present invention substantially as seen along the line 4—4 of Figure 3.

Referring to the drawings there is shown in Figure 2 an electrotype generally designated by the numeral 10, the printing surface of which is to be reproduced. Referring to Figure 4, it will be seen that the electrotype 10 includes a thin shell 12 which is customarily formed of copper and a quantity of backing metal 14 filling the shell 12 and having a smooth and level back surface 16. The surface of the electrotype 10 has raised printing surfaces 18 which are slightly raised above non-printing portions 20 of the letters which are in turn positioned above the non-printing areas such as 22 which may be routed or otherwise cut away in the original from which the electrotype 10 was reproduced.

In reproducing the printing surfaces 18, a flong 24 is first placed upon the printing surface of the electrotype 10. The flong is formed of fibrous material such as can be derived from wood pulp and contains a moisture content of from 18% to 50% or even as high as 55%. The fibers in the flong are packed and randomly arranged and, accordingly, are readily deformed to reproduce in reverse the printing surfaces 18. One or both faces of the flong may be clay coated. If the moisture content is thereafter substantially reduced, the flong 24 retains the reverse impression of the printing surfaces 18 as is known in the art.

In general the flong 24 is molded by placing upon it a molding blanket and applying pressure to the assembly of the molding blanket, the flong, and the electrotype. It is also desirable that means be provided to permit escape of moisture from the flong during the molding process and further according to the present invention that the molding blanket be permanently molded to correspond to the contoured back of the molded flong and permanently adhered thereto.

To this end an improved molding blanket generally designated by the numeral 30 has been provided. Blanket 30 is a porous fibrous sheet made of any suitable fibrous material such as paper or wood pulp. The sheet, designated by the numeral 26 in the drawing, is impregnated with a thermosetting resin such as a phenolic resin. Such a resin impregnated fibrous sheet is available commercially under the trademark "Kimpreg" and contains approximately 54% resin by weight. The impregnated sheets useful in the present invention to form molding blankets are substantially compressible and further after being fully cured are substantially compressible to a thickness in the order of approximately 25% of the original thickness thereof under stereotype molding pressures.

In carrying out the present invention, the resin impregnated fibrous sheet is first cured at elevated temperature and without the application of pressure whereby to cure fully the resin content of the sheet. This curing process can be suitably carried out on a hot plate such as the hot plate 28 illustrated in Figure 1. The sheet 26 is placed upon the heating surface of the hot plate, the heating surface of the hot plate being at a temperature for example of 420° F. Heating of the sheet 26 is continued for about two minutes or for a suitable length of time to convert the uncured resin to the cured condition.

The cured resin impregnated sheet then has applied to it in any suitable manner an adhesive coating which is used during the molding operation to secure the resin impregnated sheet 26 to the flong 24. The adhesive layer must be such that it can be activated and set by the stereotype matrix molding process. For example, the adhesive can be activated by water escaping from flong 24 and to this end an adhesive layer is preferably formed from a water soluble adhesive such as wheat paste. In order to be able to ascertain quickly and conveniently which surface of the resin impregnated sheet has the adhesive applied thereto, the adhesive is preferably colored by adding a suitable dye thereto. After the cured resin impregnated sheet has had the colored adhesive coating applied thereto, the sheet becomes the molding blanket 30 of the present invention. As may be best seen in Figure 4, the molding blanket 30 includes the fully cured resin impregnated sheet 32 having the dyed adhesive layer 34 applied thereto.

In order to facilitate escape of moisture from the flong 24 through the molding blanket 30 and outwardly therefrom, a moisture escape path is provided in the molding assembly. More specifically, a sheet 35 of kraft paper is placed over the molding blanket 30 and a fine mesh screen designated by the numeral 36 is provided on top of the sheet 35. It is desirable that the top surface of the blanket 30 be smooth and level after molding and to this end a heavy plate 38 has been provided having a plurality of moisture escape apertures 40 therein. The kraft paper sheet 35 prevents the openings in screen 36 from being reproduced on the back of molding blanket 30. Positioned on top of plate 38 in the molding assembly is an absorbent drying blanket 42 which may be made of cotton, felt or some similar moisture absorbing material. Rigid plate 38 insures that the back of molding blanket 30 is smooth after molding and wire screen 36 prevents portions of the molding blanket 30 from being deformed upwardly into apertures 40 in plate 38. Wire screen 36 in combination with apertures 40 in plate 38 and the presence of drying blanket 42 aid in permitting escape of moisture from flong 24 through the molding blanket 30 and outwardly therefrom.

Figure 3:
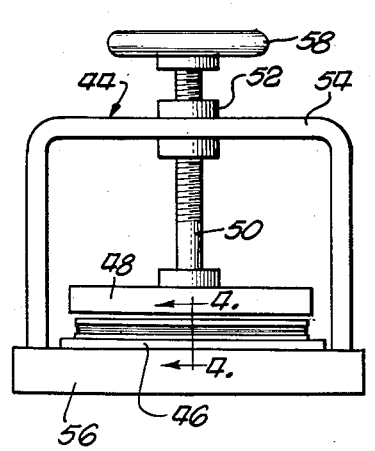
Figure 3 is a diagrammatical view illustrating the molding of the stereotype matrix according to the present invention, the assembly of Figure 2 being shown in position in a press before the press is closed.

The assembly of the electrotype 10, the flonge 24, the molding blanket 30, the paper sheet 35, the wire screen 36, the aperture plate 38 and the drying blanket 42 as illustrated in Figure 4 is assembled in a press such as the hand press shown in Figure 3 and designated by the numeral 44 to achieve molding of the flong 24 and molding blanket 30. The hand press is shown only to illustrate the process and in actual practice higher capacity presses such as hydraulic presses are used to achieve the high pressure desired. Press 44 includes a bottom platen 46 which is preferably heated and an upper platen 48 which is movable. Its position is adjusted by a threaded shaft 50 attached thereto and engaging a threaded nut 52 supported by a U-shaped frame 54 mounted on a base 56 which also supports bottom platen 46. A hand wheel 58 serves to move platen 48 toward and away from platen 46 through the action of the threaded shaft 50.

Figure 6:
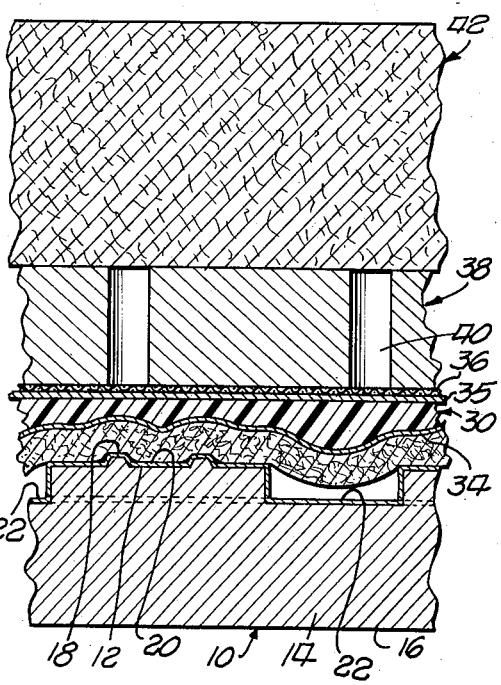
Figure 6 is an enlarged view in vertical section similar to Figure 4 showing the parts after the application of heat and pressure, the flong and molding blanket having been molded upon the stereotype substantially as seen in the direction of the arrows along the line 6—6 of Figure 5.
Figure 8:
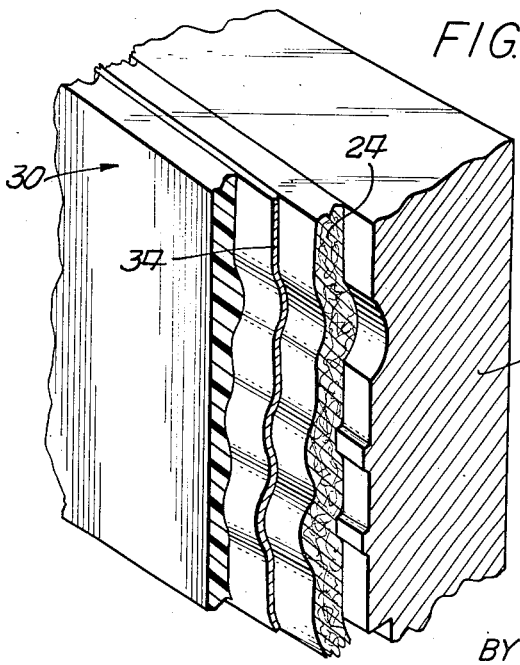
Figure 8 is a perspective view with certain portions broken away on an enlarged scale of a molded stereotype matrix made according to the present invention.

With the assembly positioned in press 44 as illustrated in Figure 3, the upper platen 48 is lowered upon the assembly while the lower platen 46 is maintained at the elevated molding temperature. Sufficient pressure is exerted upon upper platen 48 so that the molding blanket 30 and the flong 24 are deformed as illustrated in Figure 6 to reproduce the printing surfaces 18 in the lower surface of flong 24. The upper surface of flong 24 is also slightly contoured around the printing surfaces 18 over the non-printing areas 20 and is more heavily contoured over the non-printing areas 22. The molding blanket 30 is compressible in a vertical direction as viewed in Figure 6 whereby the contouring of the upper surface of flong 24 is communicated to molding blanket 30 and contours the lower surface of molding blanket 30. The upper surface of molding blanket 30 meanwhile is held flat by plate 38 acting through screen 36 and sheet 35. As will be explained more fully hereinafter, this contouring of the lower surface of blanket 30 gives support for the molded flong 24 during the casting of stereotype prints therefrom.

During the molding operation, water escaping from flong 24 activates the water soluble adhesive layer 34 whereby to cause this layer to secure blanket 30 to the upper surface of flong 24. Excess moisture escapes upwardly through blanket 30 through the openings in screen 36 and apertures 40 in plate 38 into the water absorbent blanket 42. Heat from lower platen 46 is conducted upwardly through the electrotype 10 whereby to dry flong 24 to the desired degree. It will be seen that flong 24 when treated in this manner will produce a direct pressure baked stereotype matrix. Proper drying of flong 24 can be achieved by heating the flong under pressure for several minutes.

After drying and molding of flong 24, the press 44 is opened by raising the upper platen 48. Blanket 42, plate 48 and screen 36 are then removed. Thereafter the new stereotype matrix made according to the present invention is removed from electrotype 10 and scorched in the usual manner.

The new molded stereotype matrix includes the molded blanket 30 which has a free flat surface 60 which can be placed against a suitable support for casting of stereotype printing plates. The adhesive covered surface of blanket 30 has been contoured to conform to the surface of flong 24 opposite the molded surface. The contouring of blanket 30 is complementary to the contouring of flong 24 whereby blanket 30 gives maximum support for all the contoured portions of flong 24. Moreover adhesive layer 34 serves to unite blanket 30 to the molded flong 24.

As has been illustrated in Figure 6 the flong 24 does not exactly reproduce the non-printing surfaces between the printing surfaces 18 but the printing surfaces 18 are faithfully reproduced in the molded surface of flong 24. Accordingly, accurate stereotype printing plates can be cast from the new matrix, such as the matrix illustrated in Figure 7 and generally designated by the numeral 62. Casting of stereotype plates is achieved by placing the matrix 62 in a conventional casting box having a support surface against which is placed the surface 60 of blanket 30 and thereafter pouring hot stereotype metal into the casting box and casting it against the molded surface of flong 24. It has been found that as many as 25 or more stereotype printing plates can be cast from a single stereotype matrix 62 without any appreciable deformation or dimensional distortion of the matrix 62.

In order to illustrate further the present invention, a specific example will be given. It is to be understood that this example is given for purposes of illustration and is not to be construed as a limitation of the invention.

*Example 1*

A molding blanket 30 was first produced by heating a resin impregnated sheet 26. Sheet 26 was a sheet of "Kimpreg" which is a porous paper sheet impregnated with phenol formaldehyde resin. The resin content of the sheet was about 54% and the thickness of the sheet was about 0.037 inch. Sheet 26 was placed upon hot plate 28 which had had the heating surface thereof raised to a temperature of 420° F. Sheet 26 was cured on hot plate 28 for two minutes. No pressure was applied during the curing operation and the color of the sheet turned from a light brown to a dark brown or almost burnt color.

An adhesive solution was then made by placing 760 grams of wheat paste in 2½ gallons of water to form a slurry. A red water soluble dye was added in sufficient quantity to render the paste solution a deep red color. The paste solution was then applied to one surface of the fully cured sheet 26 and permitted to dry. This produced a molding blanket 30 according to the present invention. This blanket can be compressed substantially in the direction perpendicular to the surface thereof.

The molding of a flong using blanket 30 was carried out as follows. A molding assembly was made in order to reproduce the printing surface on electrotype 10. To this end the flat side 16 of electrotype 10 was placed downwardly thereby positioning the printing surfaces 18 upwardly. A wood pulp flong 24 was then prepared having a water content of 50% by weight. The prepared flong was placed upon the printing surface 18. Thereafter a molding blanket 30 was positioned upon the flong with the adhesive surface 34 positioned against the flong. The adhesive surface 34 was easily found since this surface was colored with red dye. Next the kraft paper sheet 35 was placed upon the upper surface of molding blanket 30 and on top of sheet 35 was placed screen 36. Screen 36 was a 100 mesh screen. Plate 38 was then positioned upon screen 36. Plate 38 was ⅛ inch thick and had a plurality of number 59 drill holes formed therein with the centers thereof positioned ¼ inch apart in all directions. There was placed on top of plate 38 the drying blanket 42 which was formed of felt and was ½ inch thick.

The molding assembly was then placed in press 44 as illustrated in Figure 3, the lower platen 46 having been heated to a temperature of about 290° F. to 300° F. The upper platen 48 which was unheated was then lowered and urged against the upper surface of blanket 42 under a pressure of about 1,000 lbs. per square inch.

Figure 5:
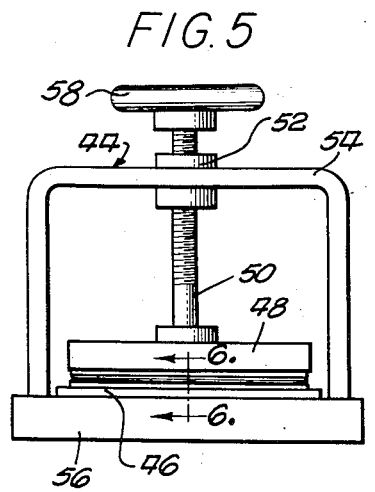
Figure 5 is a view similar to Figure 3 showing the press in the closed position during the molding of the flong and the molding blanket against a stereotype to be reproduced.
Figure 7:
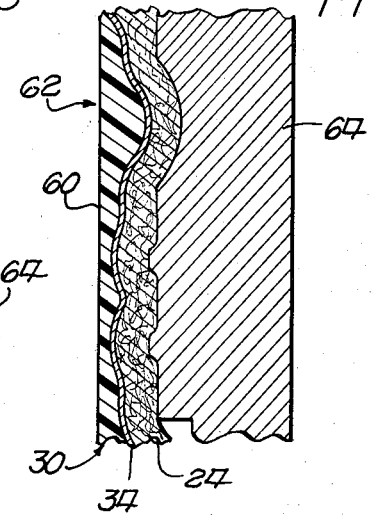
Figure 7 is an enlarged partial view in vertical section illustrating the casting of a stereotype printing plate using the stereotype matrix of the present invention.

After the press was closed as illustrated in Figure 5, heating was continued for 15 minutes to produce the molded stereotype matrix 62, see Figure 7. After 15 minutes the press was opened by raising upper platen 48 and the molding assembly removed therefrom. After removing blanket 42, plate 38 and screen 36, the matrix 62 was stripped from the electrotype 10.

It was found that the surface 60 of blanket 30 was perfectly flat and that the adhesive layer 34 had been activated and had secured molding blanket 30 to the molding flong 24. The surface of flong 24 which had been positioned against the electrotype 10 had been molded to reproduce therein in reverse accurate impressions of the printing areas 18. It further was noted that the surface of flong 24 opposite the molded surface was contoured slightly in the non-printing areas 20 and to a great extent in non-printing area 22 and that molding blanket 30 had been contoured on the adhesive surface thereof to conform exactly to the contouring of the back of flong 24.

Although the molding pressure used was low, namely 1,000 lbs. per square inch as compared with prior art molding pressures which may be as high as 2,000 to 4,000 lbs. per square inch, it was found that the impression corresponding to the type face and the halftone areas were unusually clear and indicated that high pressures were present at these points. This in turn indicated that the total press pressure was concentrated on the areas corresponding to the type faces and the halftones resulting in a high pressure at these points. This can result only if the molding blanket 30 molds in a vertical direction and resists lateral distortion or crawling into the non-printing areas which would reduce the pressure on the type face and halftones. There was no disagreeable odor evolved during the molding of the matrix or the scorching thereof. The matrix was firm and stiff when first removed from the electrotype and there was no indication of shrinking or linear distortion during the cooling of the matrix or the scorching thereof.

Stereotype printing plates 64 were then prepared from matrix 62 by pouring stereo metal at a temperature of 520° F. against the matrix while it was supported against surface 60. Twenty-five stereotype printing plates were successfully cast and it was ascertained that there was substantially no dimensional distortion detectable even in the 25th stereotype plate. Four color plates were then produced as described above to determine in an empirical way the amount of distortion produced in the matrix 62 by repeated casting therefrom. It was found that the fifth casting from one color could be used successfully with the 25th casting of another color and obtain good register during printing. This empirical test indicated that there was substantially no dimensional distortion during casting of the stereotype printing plates from the new improved matrix 62.

Molding blanket 30 can be produced from other resin impregnated sheets besides that illustrated in Example 1. In general any porous fibrous sheet may be used, the sheet being impregnated with a thermosetting resin. Preferably the sheet has a thickness of 0.035 to 0.040 inch. A preferred class of thermosetting resins is phenolic resin and a preferred phenolic resin is phenol formaldehyde resin. The resin content of the sheet may be more or less than 54% given by way of illustration. The resin content further must be such that the finished blanket 30 is substantially compressible in a direction perpendicular to its face to a thickness at least in the order of 25% of its original thickness. For example, a resin impregnated sheet having an initial thickness of 0.040 inch is sufficiently porous that it can be compressed to a thickness of about 0.010 inch in the halftone areas. Therefore the resin content must not be so high that the blanket is not compressible to substantially this extent.

The resin impregnated sheet must be fully cured without pressure and any suitable combination of temperature and time may be utilized to achieve the complete cure. The relationship between the curing time and curing temperature will vary with the particular resin utilized for impregnation as is known in the art. Other suitable means of curing such as closed ovens, infrared heating and the like may be used instead of the hot plate illustrated. A satisfactory method of determining when the impregnated sheet has been sufficiently cured is to observe the color thereof which turns from a light brown to a dark brown or almost burnt color when the curing of the resin is substantially complete.

Any adhesive that can be activated by the stereotype matrix molding process can be used. A preferred group of adhesives is that which can be activated with water. A preferred type of adhesive is the dextrine type, ordinary wall paper paste or wheat paste being the preferred adhesive. Other suitable methods of applying adhesive can be used. For example, the adhesive may be applied as a dry dust to the surface to be coated and the excess adhesive brushed off. A light mist of water can then be sprayed upon the adhesive covered surface thereby bonding the adhesive to the molding blanket. This method has certain advantages over the method set forth in Example I in that less water need be evaporated to produce the finished molding blanket.

A red dye has been illustrated to color the adhesive since this color will contrast with the color of the remaining portions of the molding blanket. Any other dye the color of which contrasts with the color of the molding blanket can be used in place of the red dye illustrated. Any suitable wet type flong may be used provided the flong has a suitable moisture content, for example 25% to 50% or even 55% by weight.

The molding of the flong 24 and blanket 30 can be carried out at pressures higher or lower and at temperatures higher or lower than those illustrated provided that the temperature and time are so chosen as to give a clean impression of the printing surface 18 in the flong 24 and are sufficient to dry flong 24 to the desired extent. The time of drying may be from 7 minutes to 30 minutes depending upon the pressure and temperature chosen.

Other arrangements may be used to aid removal of moisture from the flong besides the sheet 35, the screen 36, plate 38 and blanket 42 illustrated. The drying method must insure that the back of molding blanket 30 is formed substantially smooth, flat and uncontoured.

Another important advantage of the molding blanket and molding method of the present invention is the fact that "make ready" can be added during the molding of the stereotype matrix to compensate for light printing areas in the material being reproduced such as the electrotype 10 illustrated. The make ready is applied between electrotype 10 and the lower platen 46 whenever and wherever needed. This may be achieved by adding thin pieces of paper, foil or the like at the points between electrotype 10 and platen 46 which it is desired to have reproduced heavier in the stereotype matrix. The selected portions of the printing surfaces can be raised by this means in the amount of 0.002 or as much as 0.007 inch to make these areas print heavier. Press pressure deforms the other portion of the electrotype or other printing plate sufficient to make the portions thereof supported by the make ready relatively higher.

It will be seen that there has been provided an improved molding blanket for molding stereotype matrices and an improved method of molding stereotype matrices and the stereotype matrices made therefrom. Although certain preferred examples have been given for purposes of illustration, it is to be understood that various changes and modifications can be made therein without departing from the spirit and scope of the invention. Accordingly, the invention is to be limited only as set forth in the following claims.

I claim:

1. A molding blanket for use in molding stereotype matrices comprising a sheet of uncompacted fibrous material impregnated with a cured thermosetting resin and which exhibits substantial compressibility at stereotype molding pressures and a quantity of water activatable adhesive adhering to one surface of said sheet of fibrous material.

2. A molding blanket for use in molding stereotype matrices comprising a sheet of uncompacted fibrous material impregnated with a cured thermosetting resin and which exhibits substantial compressibility at stereotype molding pressures and a quantity of water activatable adhesive adhering to one surface of said sheet of fibrous material, the surface of said sheet of fibrous material having the adhesive applied thereto being colored differently from the opposite surface.

3. A molding blanket for use in molding stereotype matrices comprising a sheet of uncompacted fibrous material impregnated with a quantity of a cured phenolic resin which exhibits substantial compressibility at stereotype molding pressures and a quantity of water activatable adhesive adhering to one side of said sheet of fibrous material.

4. A molding blanket for use in molding stereotype matrices comprising a sheet of uncompacted fibrous material impregnated with a quantity of a cured phenol formaldehyde resin and which exhibits substantial compressibility at stereotype molding pressures and a quantity of water activatable adhesive adhering to one side of said sheet of fibrous material.

5. A molding blanket for use in molding stereotype matrices comprising a sheet of uncompacted fibrous material having a thickness of substantially 0.035 inch to 0.040 inch impregnated with a cured thermosetting resin and which exhibits substantial compressibility at stereotype molding pressures, said thermosetting resin constituting about 50% by weight of the impregnated sheet, and a quantity of water activatable adhesive adhering to one side of said impregnated sheet.

6. A stereotype matrix comprising a molded flong and a molding blanket secured thereto and providing a backing for said flong, said molding blanket including a cured thermosetting resin impregnated fibrous sheet, the free surface of said flong having the printing matter molded therein and the contacting surfaces of said blanket and said flong being contoured in the non-printing areas, the free surface of said molding blanket being flat.

7. A stereotype matrix comprising a molded flong and a molding blanket in juxtaposition, and a quantity of adhesive between said flong and said molding blanket adhering said molding blanket to said flong, said molding blanket including a sheet of fibrous material impregnated with a cured phenolic resin, the free surface of said flong having printed matter molded therein and the contacting surfaces of said sheet and said flong being contoured in the non-printing areas, and the free surface of said molding blanket being flat.

8. A stereotype matrix comprising a molded flong and a molding blanket in juxtaposition, and a layer of adhesive between said flong and said molding blanket adhering said molding blanket to said flong, said molding blanket consisting substantially of a layer of paper sheet material impregnated with a cured phenolic resin, the free surface of said flong having printed matter molded therein and the contacting surfaces of said blanket and said flong being contoured in the non-printing areas, the free surface of said molding blanket being flat.

9. A stereotype matrix comprising a molded flong and a molding blanket in juxtaposition, and a layer of adhesive between said flong and said molding blanket adhering said molding blanket to said flong, said molding blanket consisting substantially of a layer of paper sheet material impregnaed with a cured phenol formaldehyde resin, the free surface of said flong having printing matter molded therein and the contacting surfaces of said blanket and said flong being contoured in the non-printing areas, the free surface of said molding blanket being flat.

10. A stereotype matrix comprising a molded flong and a molding blanket in juxtaposition, and a layer of adhesive between said flong and said printing blanket adhering said molding blanket to said flong, said molding blanket consisting substantially of a layer of paper sheet material; having a maximum thickness of between about 0.035 inch and about 0.040 inch and impregnated with a cured phenol formaldehyde resin, the resin constituting about 50% by weight of the impregnated sheet, the free surface of said flong having printing matter molded therein and the contacting surfaces of said blanket and said flong being contoured in the non-printing areas, the free surface of said molding blanket being flat.

11. The method of molding a stereotype matrix from printing matter including raised printing areas and depressed non-printing areas comprising forming an assembly of a wet flong upon the printing matter, a molding blanket upon the flong including a sheet of uncompacted fibrous material impregnated with a substantially fully cured thermosetting resin, which molding blanket exhibits substantial compressibility at stereotype molding pressures, and a hard flat surface juxtaposed to the top of said molding blanket, and thereafter applying elevated temperature and pressure to the resultant assembly to impress the printing areas in said flong and to remove a substantial portion of the water content therefrom while contouring the contacting surfaces of said blanket and said flong in the non-printing areas.

12. The method of molding a stereotype matrix from printing matter including raised printing areas and depressed non-printing areas comprising forming an assembly of a wet flong upon the printing matter, a molding blanket upon the flong including a sheet of uncompacted fibrous material impregnated with a substantially fully cured thermosetting resin, which molding blanket exhibits substantial compressibility at stereotype molding pressures, and a hard flat surface and water escape means juxtaposed to the top of said molding blanket, and thereafter applying elevated temperature and pressure to the resultant assembly to impress the printing areas in said flong and to remove a substantial portion of the water content therefrom while contouring the contacting surfaces of said blanket and said flong in the non-printing areas.

13. The method of molding a stereotype matrix from printing matter including raised printing areas and depressed non-printing areas comprising forming an assembly of a wet flong upon the printing matter, a molding blanket upon the flong including a sheet of uncompacted fibrous material impregnated with a substantially fully cured thermosetting resin, which molding blanket exhibits substantial compressibility at stereotype molding pressures, a sheet of paper upon the molding blanket, a fine mesh screen upon the sheet of paper, and an apertured flat plate upon the screen, and thereafter applying elevated pressure and temperature to the resultant assembly to impress the printing areas in said flong and to remove a substantial portion of the water content therefrom while keeping the surface of the blanket against said screen flat and contouring the contacting surfaces of said blanket and said flong in the non-printing areas.

14. The method of molding a stereotype matrix from printing matter including raised printing areas and depressed non-printing areas comprising forming an assembly of a wet flong upon the printing matter, a molding blanket engaging the wet flong and including a sheet of uncompacted fibrous material impregnated with a substantially fully cured thermosetting resin, which molding blanket exhibits substantial compressibility at stereotype molding pressures and a layer of water activatable adhesive upon the surface of said blanket engaging the flong, a paper sheet engaging the other surface of the molding blanket, a fine mesh screen upon the paper sheet, and an apertured flat plate upon the screen, and thereafter applying elevated pressure and temperature to the resultant assembly to impress the printing areas in said flong and to remove a substantial portion of the water content therefrom while keeping the surface of the blanket against said screen flat and contouring the contacting surfaces of said blanket and said flong in the non-printing areas.

15. The method of molding a stereotype matrix from printing matter including raised printing areas and depressed non-printing areas comprising forming an assembly of a wet flong upon the printing matter, a molding blanket including a sheet of uncompacted fibrous material impregnated with a substantially fully cured thermosetting resin, which molding blanket exhibits substantial compressibility at stereotype molding pressures and having a layer of water activatable adhesive on one surface thereof with the adhesive surface against the flong, a paper sheet upon the molding blanket, a fine mesh screen upon the paper sheet, and an apertured flat plate upon the screen, and thereafter applying elevated pressure and temperature to the resultant assembly to impress the printing areas in said flong and to remove a substantial portion of the water content therefrom while keeping the surface of the blanket against said screen flat and contouring the contacting surfaces of said blanket and said flong in the non-printing areas.

16. The method of making a stereotype printing plate from printing matter including raised printing areas and depressed non-printing areas comprising forming an assembly of a wet flong upon the printing matter, a molding blanket upon the flong including a sheet of uncompacted fibrous material impregnated with substantially fully cured thermosetting resin, which molding blanket exhibits substantial compressibility at stereotype molding pressures, and a hard flat surface engaging the top of said molding blanket, applying elevated temperature and pressure to the resultant assembly to impress the printing areas in said flong and to remove a substantial portion of the water content therefrom, and thereafter removing the stereotype matrix so formed from the printing matter and casting a stereotype printing plate therefrom while the free surface of the molding blanket is against a flat surface while contouring the contacting surfaces of said blanket and said flong in the non-printing areas.

17. The method of making a stereotype printing plate from printing matter including raised printing areas and depressed non-printing areas comprising forming an assembly of a wet flong upon the printing matter, a molding blanket upon the flong including a sheet of uncompacted fibrous material impregnated with a substantially fully cured thermosetting resin, which molding blanket exhibits substantial compressibility at stereotype molding pressures, a paper sheet upon the molding blanket, a fine mesh screen upon the paper sheet, and an apertured flat plate upon the screen, applying elevated pressure and temperature to the resultant assembly to impress the printing areas in said flong and to remove a substantial portion of the water content therefrom while keeping the surface of the blanket against said screen flat and contouring the contacting surfaces of said blanket and said flong in the non-printing areas, and thereafter casting a stereotype plate from the stereotype matrix so formed while the flat surface of said blanket is against a flat support surface.

References Cited in the file of this patent

UNITED STATES PATENTS

| Number | Name | Date |
|---|---|---|
| 542,847 | Eastwood | July 16, 1895 |
| 678,381 | Drewett | July 16, 1901 |
| 1,377,510 | Novotny | May 10, 1921 |
| 1,398,142 | Novotny | Nov. 22, 1921 |
| 1,610,515 | Hadaway | Dec. 14, 1926 |
| 1,726,151 | Hole | Aug. 27, 1929 |
| 2,041,941 | Matuschke et al. | May 26, 1936 |
| 2,703,051 | Richardson | May 1, 1955 |

U. S. DEPARTMENT OF COMMERCE
PATENT OFFICE

CERTIFICATE OF CORRECTION

Patent No. 2,831,224    Herbert Libberton      April 22, 1958

It is hereby certified that error appears in the printed specification of the above numbered patent requiring correction and that the said Letters Patent should read as corrected below.

Column 3, line 29, for "steretype" read -- stereotype --; column 10, line 49, for "impregnaed" read -- impregnated --; column 12, lines 31 and 32, strike out "while contouring the contacting surfaces of said blanket and said flong in the non-printing areas" and insert the same after "therefrom," in line 27, same column.

Signed and sealed this 17th day of June 1958.

(SEAL)
Attest:

KARL H. AXLINE
Attesting Officer

ROBERT C. WATSON
Commissioner of Patents